(12) United States Patent
Li et al.

(10) Patent No.: US 6,513,858 B1
(45) Date of Patent: Feb. 4, 2003

(54) ROLL-UP CAR COVER

(76) Inventors: Xingkang Li, 17 Eastham St., Worcester, MA (US) 01604; Qiang Li, 1029 Main St. West, Room 303, Hamilton, Ontario (CA), L8S 4P3; Xingjian Li, Tuanjie Road, Tuanjie Village 1, Building 1, Unit 1, Room 202, Wuhu, Anhui (CN)

( * ) Notice: Subject to any disclaimer, the term of this patent is extended or adjusted under 35 U.S.C. 154(b) by 0 days.

(21) Appl. No.: 10/161,762

(22) Filed: Jun. 3, 2002

(51) Int. Cl.[7] .................................................. B60J 11/00
(52) U.S. Cl. ........................................ 296/136; 150/166
(58) Field of Search .................... 296/98, 136; 280/770; 150/166

(56) References Cited

U.S. PATENT DOCUMENTS

| | | | | |
|---|---|---|---|---|
| 4,718,711 A | * | 1/1988 | Rabbit | 296/136 |
| 4,825,889 A | * | 5/1989 | Monteith | 296/136 |
| 4,834,446 A | * | 5/1989 | Tung-Chow | 296/136 |
| 4,925,234 A | * | 5/1990 | Park et al. | 296/136 |
| 4,929,016 A | * | 5/1990 | Kastanis | 296/136 |
| 4,958,881 A | * | 9/1990 | Piros | 296/136 |
| 5,022,700 A | * | 6/1991 | Fasiska et al. | 160/26 |
| 5,029,933 A | * | 7/1991 | Gillem | 150/166 |
| 5,176,421 A | * | 1/1993 | Fasiska | 150/166 |
| 5,378,035 A | * | 1/1995 | Wu | 150/166 |
| 5,401,074 A | * | 3/1995 | Timerman | 296/136 |
| 5,516,181 A | * | 5/1996 | Thompson | 150/166 |
| 5,597,196 A | * | 1/1997 | Gibbs | 296/136 |
| 6,012,759 A | * | 1/2000 | Adamek | 296/136 |
| 6,131,643 A | * | 10/2000 | Cheng et al. | 296/136 |

FOREIGN PATENT DOCUMENTS

FR  2585299  *  1/1987  .................. 296/136

* cited by examiner

Primary Examiner—D. Glenn Dayoan
Assistant Examiner—Jason Morrow
(74) Attorney, Agent, or Firm—Donald W. Meeker

(57) ABSTRACT

A spring tensioned roller and spaced tension bar have a vehicle cover folded in half and rolled around the spring tensioned roller. The rear half of the cover has an end rod and a central opening which allows it to be hooked over a trunk lock mechanism and kept secure when the trunk is shut. The front half of the cover has a lead rope or belt with two hooks for securing it under the hood of the vehicle or any other edged surface on the front of the car. The tensioned cover is elevated above the roof of the vehicle by the roller and tension bar for purposes of ventilation.

9 Claims, 1 Drawing Sheet

ROLL-UP CAR COVER

BACKGROUND OF THE INVENTION

1. Field of the Invention

The present invention relates to car covers and in particular to a roll-up car cover with a two-way spring-loaded roller that has an elongated canvas that hooks over the trunk lock inside the trunk at one end and under the edge of the hood at the other end with a centrally positioned roller and spaced tension bar that maintains the cover elevated above the roof of the car.

2. Description of the Prior Art

Motor vehicles which are not garaged are subject to the harsh outdoor conditions including bright sun overheating the interior and bleaching out the paint job, snow and frost collecting on the windshield and rear window creating hazardous viewing conditions, hailstorms causing major damage to window surfaces and metal painted exterior surfaces.

Many attempts have been made to provide protection for motor vehicles in the form of fabric easily storable coverings. Both complicated and non-complicated means have been devised to protect vehicles from the detriments of the environment. Namely, the sun, dust and dirt, and frozen precipitation. The lack of widespread use of such coverings can be attributed to an inadequate balance of affordability, convenience, adaptability, and performance to make them practical for everyday use.

Simple fabric coverings can be difficult and time consuming to apply for one person. Also adaptability to fixed antennas is often not considered. The user who is faced with removing an antenna to apply a cover is likely to balk at using a cover of this type on a daily basis.

Some covering arrangements create their own problems by changing the outside appearance of the vehicle, even when it is not in use. This is disastrous for acceptability.

Most of the prior art in this classification do not attempt to provide an airspace between the cover and the surfaces of the motor vehicle. Without an airspace and means for cross ventilation, motor vehicle coverings do not address the problem of heat and moisture build-up. Excess interior heat and mildew are the negative results.

Without the use of an airspace, frozen precipitation, such as hail, can damage a motor vehicle even though it is covered. Furthermore, without an airspace the covering is of no use in preventing frozen precipitation from accumulating and bonding to the covering and motor vehicle.

Daily use of covers means that a few seconds can separate a convenient process from an inconvenient process. Much of the prior art falls into the category of inconvenience; making them unacceptable for the daily user.

U.S. Pat. No. 6,012,759, issued Jan. 1, 2000 to Adamek, provides a retractable vehicle cover comprising at least one cover reel and at least one extension line reel disposed within a housing. The cover reel and the extension line reel are biased in a retracted position. Each cover reel contains a cover, and each extension line reel contains an extension line. At least one cover leading edge extends from the housing, and at least one extension line extends through each cover leading edge. An extension line cover stop allows the extension line(s) to extend a cover, and an extension line end stop prevents extension line retraction into the housing. The housing is aerodynamically shaped to reduce drag on a vehicle upon which the retractable vehicle cover is mounted. Each cover leading edge is equipped with a cover strip magnet which holds the cover in an extended position. In the alternative, the cover strip magnet may be adhered to a ferromagnetic strip on the housing, which securely holds the cover leading edge in a retracted position. The housing may comprise a housing strip magnet by means of which the retractable vehicle cover may be removably mounted on a vehicle.

U.S. Pat. No. 5,516,181, issued May 14, 1996 to Thompson, reveals a roll-up covering for motor vehicles comprised of a rectangular main section 10 and side flaps 14 with antenna slits 18, 20 in either to accommodate antennas. A cylinder 16 is fixed perpendicular to the length of the main section and located between the main section and the top of the vehicle while in use. The side flaps 14 partially cover the side of the vehicle while in use and fold over the top of the main section for removal. Combined, the covering rolls around the cylinder for compact storage. Rear adjustable straps 26 anchor the covering in the rear compartment of the vehicle for theft prevention and as a means of changing the fit of the covering. Front elastic straps 11 and side elastic straps 12, in conjunction with the rear adjustable straps and the cylinder, tension the main section and side flaps to provide an airspace 34. The airspace between the covering material and the majority of the top vehicle surfaces provides for insulation and ventilation.

U.S. Pat. No. 4,929,016, issued May 29, 1990 to Kastanis, enables a protective covering for a vehicle selectively mountable on an exterior surface of a vehicle. The protective covering includes a pair of extendable and retractable, flexible, sheet-like covering means movable between a full extended position for covering a selected portion of the vehicle and a retracted position for storage. Each covering means is coupled to a means for winding the covering means about an axis and a housing supports the pair of winding means relative to one another such that the winding means are closely adjacent and their winding axes are in substantially parallel relation to one another. Means are provided for selectively securing the housing to an exterior surface of the vehicle and for selectively securing the covering means in their extended positions, to the vehicle to be covered.

U.S. Pat. No. 5,022,700, issued Jun. 11, 1991 to Fasiska, shows a portable automatic cover for an object, which automatically extends over the object and retracts into a storage position. The cover has one end attached to a roller which is rotatably attached to the object. A number of adjustable brackets are positioned along the upper and side surfaces of the object. Guide elements are attached to the cover and slidably and interlockably connected to the brackets. When the cover is extended over the object, the adjustable brackets automatically unfold, raising the cover upward and extending the flaps sideways to protect the object. For military purposes, when an air compressor or a liquid pump is actuated, the double layer of the cover and the flaps are filled with air or any liquid of desired temperature, thus, providing instant automatic camouflage and also protective covering against enemy detection and attack by heat seeking missiles.

U.S. Pat. No. 4,925,234, issued May 15, 1990 to Park, indicates a length adjustable, trunk stowable protective car cover device is formed from an elongated sheet of flexible weatherproof material having a front end portion releasably connectable to the front end of an automobile, a longitudinally intermediate portion adapted to overlie and shield essentially the entire upper side surface of the automobile, and a rear end portion adapted to extend into the trunk between the rear trunk lid edge and the opposing trunk wall portion which it closes against. Closure of the trunk thus clamps a back end of the cover sheet in place to firmly anchor the cover sheet in place in its operative position. An elongated longitudinal slot in the rear end portion of the cover sheet permits the hook portion of the trunk latch to extend through the cover sheet to permit unimpeded locking and unlocking of the trunk. A fastening structure is provided to adjustable secure the rear end portion of the cover sheet within the trunk in a manner permitting selective variation in the effective covering length of the sheet. The sheet may be conveniently stowed in a longitudinally folded orientation within the trunk and then unfolded over the top of the automobile. To facilitate such folding and unfolding, a grab bar is transversely secured to the front end of the sheet and a spaced series of transverse stays are suitably secured to a longitudinally intermediate portion thereof.

U.S. Pat. No. 5,378,035, issued Jan. 3, 1995 to Wu, puts forth an automobile sunshade assembly including a winding device including an axle assembly on which is wound a curtain having a rod at the outer edge, said rod being provided with a plurality of hooks, said axle assembly having a right end connected with a first bearing connected with a first wire element provided with a planar member and a left end formed with a slot connected with a left hook end of a spring, said axle assembly further having a second wire element provided with a horizontal portion having a stop at the right end and a planar member at the left end and a second bearing connected with the left end of said axle assembly and a sleeve, the stop of said axle assembly being engaged with the right hook end of said spring, a casing for receiving said axle assembly, a base tray for receiving said casing, four supporting brackets each provided on the top with a rotatable rod and a plurality of magnets on the bottom, and two bands each having a rod at both sides for engaging with doors of the automobile, whereby the automobile can be effectively kept off from the sun.

U.S. Pat. No. 6,131,643, issued Oct. 17, 2000 to Cheng, shows a sun shield device for automobile includes a tubular central axle, a revolving sleeve which has a diameter larger than and a length shorter than that of the central axle being rotatably supported around the central axle, a shading sheet engaged on and wound around the revolving sleeve, an auto-rewinding device which is installed between the central axle and the revolving sleeve for driving the revolving sleeve to rotate so as to automatically rewind the shading sheet around the revolving sleeve, a supporting device including a pair of supporters extendably connected to two ends of the central axle respectively, and an adjusting device for adjusting the length of at least one of the supporters so as to adjust an overall length of the sun shield device until two supporting end members of the two supporters respectively firmly pressed against two interior side walls of a trunk of an automobile so as to horizontally support the sun shield device within the trunk. Whereby, the user may simply open the trunk cover and pull the shading sheet from the revolving sleeve out of the trunk through the gap formed between the opened trunk cover and trunk edge for at least covering the roof of the automobile.

U.S. Pat. No. 5,597,196, issued Jan. 28, 1997 to Gibbs, claims an automobile cover deployment and storage system for the deploying and storing of an automobile cover. The system is provided with a roller assembly which can be made to be pivotally disposed about the axis of an axle. Attached to the roller at one end and the axle at another end is a spring means. The roller assembly has attached to it a full body automobile cover. The cover having one end adapted to covering and being secured to the end of the automobile opposite from the trunk, and the other end attached to the roller. The cover wound around the roller assembly and the roller assembly is stored in the trunk compartment of the automobile. The cover can be easily unwound from and wound back onto the roller with the assistance of the spring biased roller. The operator can quickly deploy the cover by pulling it from the back of the trunk over the trunk lid, and over the car, securing it to front bumper. The trunk can be closed after the cover is secured to the front bumper, thus securing the system inside the trunk.

U.S. Pat. No. 4,834,446, issued May 30, 1989 to Tung-Chow, discloses a packing and storing device for a flexible road vehicle cover, comprises a container having an opening through which the cover can be drawn, a drainage gutter in the lower end of the container leading to a drain hole, a rotatable carrier for the cover mounted in the container and a flexible hose connected to the drain hole. Two freely rotatable rollers are provided along opposite edges of the opening. The device is placed in a luggage compartment of a vehicle and the vehicle cover can be drawn into the container, guided by the rollers, by rotating the carrier. Water collecting in the drainage gutter is conveyed to the outside of the vehicle through the hose.

U.S. Pat. No. 4,958,881, issued Sep. 25, 1990 to Piros, indicates a theft proof protective covering for parked vehicle a protective vehicle cover which includes within its design a rotatable retaining element for retaining the protective cover within the trunk of the vehicle so that it is safety stored to prevent theft and further retained within the trunk to thereby eliminate any defacing of the exterior of the vehicle or any impairment of the aerodynamics of the vehicle when the vehicle is in motion. The present invention further relates to a protective vehicle cover which can be draped over the vehicle in a manner by which the protective cover is threaded through the gap between an the top rear of an open trunk lid and the rear upper body of the trunk and thereafter spread over the vehicle while the trunk lid is closed, to thereby provide a protective cover which has a portion extending into the locked trunk so that the vehicle cover cannot be removed or stolen and at the same time provides a complete covering for the vehicle. The anti-theft device comprises an interconnecting member which connects a portion of the interior surface of the protective cover and the rotatable retaining member in the trunk, to thereby prevent the vehicle cover from being lifted off and removed by a thief. The interconnecting member extends through the gap located between the top rear of the trunk body and the rear edge of the trunk lid and extends through this gap even when the lid is closed.

U.S. Pat. No. 5,029,933, issued Jul. 9, 1991 to Gillem, illustrates a cover (A) for slowing or reducing the rate of heat build-up in an interior compartment (19) of a vehicle (10) is disclosed. The cover includes a main panel (12) having a rear window panel (14), a roof panel (16), and a front window panel (18) which generally cover the respective portions of the vehicle (10). Auxiliary side panels (20, 22) cover side windows of the vehicle. Front strap (26) envelopes the front end of the car. Rear securing straps (32) secure main panel (12) to the interior of the trunk compartment so that the cover cannot be removed when installed over the vehicle unless it is cut off providing an anti-theft feature. Preferably, the cover is a non-woven web (44) having a soft non-woven side (46) and a vinyl cover exterior side (48).

What is needed is an easy to use roll-out and roll-up car cover which has one end locked in the trunk and maintains the cover elevated above the roof of the car for greater temperature control inside the car.

SUMMARY OF THE INVENTION

An object of the present invention is to provide a motor vehicle covering that uses a process for rapid one person deployment and rapid one person removal with a spring-loaded two-way roller for rolling up and rolling out the cover. The cover is applied by beginning with the trunk open, hooking the cover's end over the trunk lock and closing the trunk, next, by extending the leading edge of the cover forward by pulling the belt or rope, and then hooking the front end under the hood of the vehicle or any other edged place.

A related object of the present invention is to provide a motor vehicle covering that anchors in the locked trunk while in use as a deterrent to theft.

An added object of the present invention is to provide a soft foam roller for rolling the cover so that the roller can be as wide or wider than the vehicle yet still be bent as needed to fit into the trunk for storage when not in use and promote portability.

Another object of the present invention is to provide a motor vehicle covering that creates an airspace between the covering, the roof and the windshield and rear windows of a motor vehicle to take advantage of the insulatory properties of air and prevent damage from hailstones or other falling debris.

One more object of the present invention is to provide a motor vehicle covering which increases cross ventilation, in conjunction with the airspace, that will aid in temperature and mildew control.

An additional object of the present invention is to provide a motor vehicle covering that has a spring-loaded double roller configuration centrally positioned on the cover so that it automatically is centrally positioned on the roof of the vehicle as the cover is extended to its open position. The roller and tension arm serve to elevate the protective cover above the vehicle roof surface allowing the air pocket to affect the interior temperature of the car.

In brief, a spring assembly with a spaced apart tension bar is mounted on a roller to make the cover retractable, which also provides the tension to keep the cover stretched tight elevated above the surface of the vehicle with the vehicle being protected. The roller and spaced tension bar arrangement maintains the cover in an elevated position above the roof of the motor vehicle. The tension in the cover keeps it stretched out and elevated above the vehicle only touching at the front edge of the hood, the back edge of the trunk, and the front and back edges of the roof.

By rolling the cover on the roller in an overlapped condition from the midpoint of the cover, the roller and spaced tension bar are automatically positioned in a central location on the roof of the motor vehicle with the cover rolled out over the vehicle. The cover unwinds in both a forward and backward direction.

There are no flaps to cover the sides of the vehicle, because the side flaps make the retraction very difficult and do not add significantly to the covering of the vehicle in terms of snow, ice, and sun protection.

The width of the covering can be wider with the use of a soft roller, which can be bent when stored in the trunk.

The cover has a leading edge attached with a soft belt or a rope with two position-adjustable hooks on the belt or the rope, which can be hooked on the edge of the hood of the vehicle or any other edged places, such as the bumper or grill. The belt or rope assists the easy guiding of the cover over the vehicle.

An advantage of the present invention is the rapid one person deployment and rapid one person removal of the motor vehicle covering.

Another advantage of the present invention is to be difficult to steal when the motor vehicle covering is anchored and held by a locked trunk.

An additional advantage of the present invention is the ability to be bent as needed to fit into the trunk for storage and portability when not in use.

One more advantage of the present invention is to create an airspace between the motor vehicle covering and car which takes advantage of the insulatory properties of air to prevent damage from hailstones or other falling debris.

A related advantage of the present invention is cross ventilation enabled by the airspace which will positively effect surface and interior car temperature and control mildew.

Yet another advantage of the present invention is the spring-loaded double roller configuration which will remain centrally positioned on the roof of the vehicle as the cover is spread over the vehicle.

A final advantage of the present invention is the spring-loaded double roller configuration, which includes the cover roller and tension arm, serves to elevate the protective cover above the vehicle roof surface allowing the air pocket to affect the interior temperature of the car.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
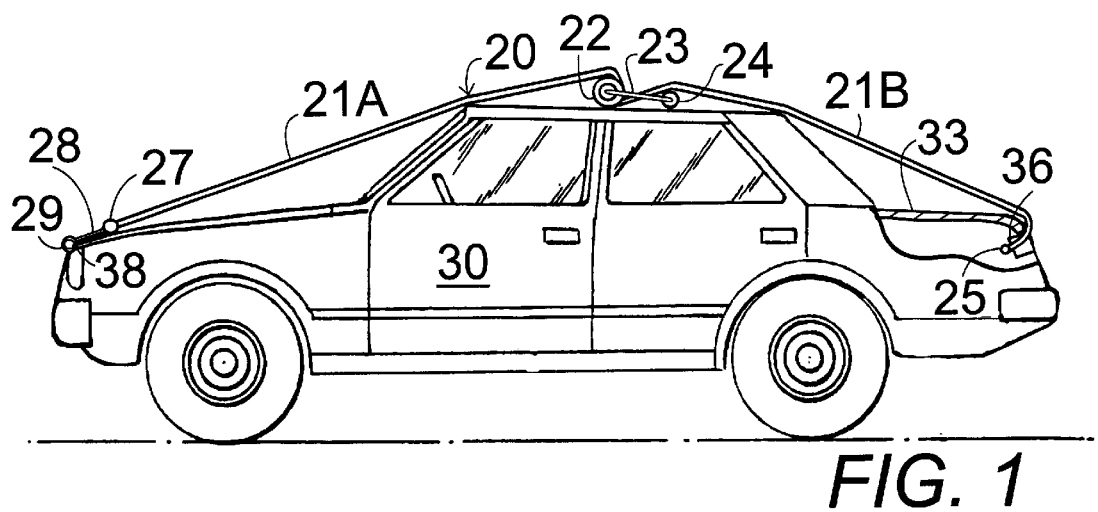
FIG. 1 is a side elevational view showing the invention covering a car.
Figure 2:
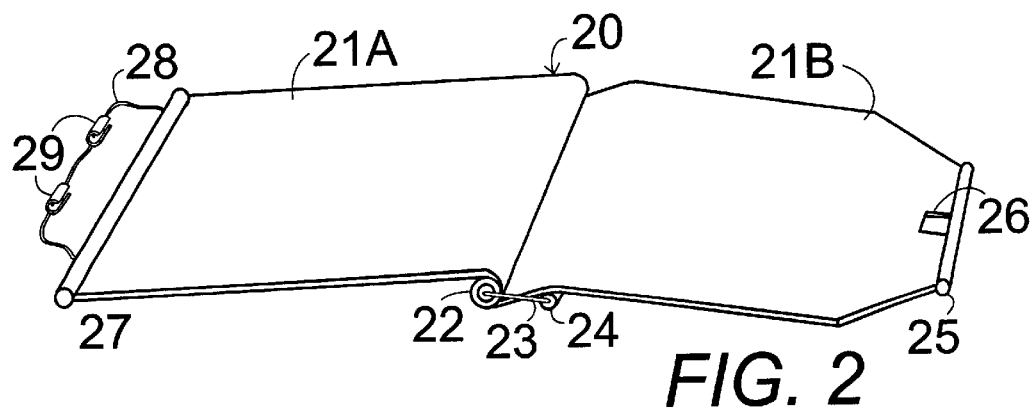
FIG. 2 is a perspective view of the invention rolled out in a configuration for covering a car.

In FIGS. 1–2, a roll-up vehicle cover 20 for protecting a top of a vehicle 30 comprises: a spring loaded roller 22, an attached L-shaped tension bar 23 and secondary roller 24, and a vehicle cover 21A, 21B which is wound around the spring loaded roller 22.

In FIGS. 1–2, the spring loaded roller 22 having an attached L-shaped tension bar 23 and secondary roller 24 is capable of wrapping a cover 20, by a rolling motion, around the spring loaded roller 22.

In FIG. 1, the L-shaped tension bar 23 is capable of pressing against the external surface of the vehicle 30 under the tension of the spring and capable of retaining the roller and spring in a tensioned condition biased toward rolling.

In FIGS. 1–2, the vehicle cover 20 has a width at least equal to a width of a roof of a vehicle 30 and has a front end 21A and a rear end 21B. The cover 20 is capable of being wound around a spring loaded roller 22 by creating a fold in the cover 20 so that the front end 21A of the cover 20 overlaps the rear end 21B of the cover 20. The cover 20 wraps around the spring loaded roller 22 with the fold parallel to and contacting the spring loaded roller 22. The front end 21A and rear end 21B of the cover 20 are free on the periphery of the spring loaded roller 22 so that when the two overlapping portions of the cover 20 are unwound, they move in opposite directions.

In FIG. 1–2, when the cover 20 is in a rolled up position, the rear half of the cover 21B is capable of being attached to a rear end of a vehicle 30, and the front half of the over 21A is capable of being pulled toward the front of the vehicle 30 by a lead belt or rope 28 causing the cover 20 to unwrap from the spring tensioned roller 22. This allows the front half of the cover 21A to be attached to a hood edge 38 or other edged surface on a grill or bumper located at the front end of a vehicle 30 by means of hooks 29 attached to the rope 28. The top of the vehicle will be covered by means of the spring tensioned roller 22 and the tension bar 24 elevating the cover above the vehicle roof and creating a tension in the cover 20 to stretch the cover tight and to bias the cover 20 in a tendency to wrap around the spring tensioned roller 22 upon release of either of the ends of the cover 20.

In FIGS. 1–2, the rear half of the cover 21B is comprised of an end portion sufficiently narrow to fit within a trunk opening 33 on the vehicle and further comprising a rigid element 25 along a far edge of the rear half of the cover 21B. The rear half of the cover 21B is provided with an opening in the center 26, which is capable of fitting over the locking mechanism 36 of the trunk 33. With the rear half of the cover 21B capable of being hooked over the locking mechanism 36 of the trunk 33, when the trunk 33 is closed, it will retain the end of the rear half of the cover 21B therein.

In FIGS. 1–2, the two overlapping portions of the cover 21A, 21B are apportioned such that the rollers 22, 24 and tension bar 23 are positioned on a roof of the vehicle 30 upon attaching both ends of the cover 20 to the vehicle so that the rollers 22, 24 and tension bar 23 maintain the cover in an elevated position above the roof of the vehicle thereby creating an air space between the cover and the roof of the vehicle.

In FIGS. 1–2, the cover 20 is further comprised of a rigid rod 27 attached across the far edge of the front end of the cover 21A. It includes a hook means such as hooks 29 on a cord means or a rope 28 connected to the rod 27 used for attaching the front end of the cover 21A to the front of the vehicle 30 on a hood edge 38 or other edged element also on the front end of the vehicle.

In FIG. 2, the corded version of the cover 20 has two hooks 29 attached thereto. The hooks 29 have non-scratching surfaces and configurations such that they are capable of hooking under a hood of the vehicle without scratching the vehicle.

In FIGS. 1–2, the rollers 22, 24 are comprised of at least one end capable of bending to enable the storage of the entire unit in a trunk 33 of the vehicle 30 when the cover is not in use on the vehicle 30.

In FIGS. 1–2, at least one end of the rollers 22, 24 are foam material.

In FIGS. 1–2, the secondary roller 24 on the tension bar 23 is spaced apart from the spring loaded roller 22, allowing the rear half of the cover 21B to unwrap between the rollers 22, 24 and to be kept elevated above the roof by the secondary roller 24. The front end 21A of the cover rolls off the top of the spring loaded roller 22 and is also thereby elevated above the vehicle 30 roof.

The cover is preferably made of a heavy weather resistant material such as rubberized canvas or heavy duty plastic.

It is understood that the preceding description is given merely by way of illustration and not in limitation of the invention and that various modifications may be made thereto without departing from the spirit of the invention as claimed.

What is claimed is:

1. A roll-up vehicle cover for covering a top of a vehicle, the cover comprising:
    a roller having a spring attached thereto capable of activating a rolling motion in the roller and a tension bar attached to the spring and spaced apart from the roller so that the tension bar is capable of pressing against an external surface under the tension of the spring and capable of retaining the roller and spring in a tensioned condition biased toward rolling;
    a vehicle cover having a width at least equal to a width of a roof of a vehicle and having a front end and a rear end, the cover capable of being wound around the roller by creating a fold in the cover so that a portion of the cover overlaps another portion of the cover with the cover being rolled around the roller with the fold adjacent to the roller and the front end and rear end of the cover are outside the rolled cover so that the two overlapping portions of the roller are capable of unrolling from the roller with a front end unrolling in an opposite direction to the rear end of the roller;
    wherein with the cover on the roller in a rolled up condition, the rear end of the cover is capable of being attached to a rear end of a vehicle and the front end of the cover is capable of being pulled toward the front of the vehicle causing the cover to unroll from the roller and the front end of the cover is capable of being attached to a front end of a vehicle, thereby covering a top of the vehicle with the roller and the tension bar elevating the cover above the vehicle and creating a tension in the cover to stretch the cover tight and to bias the cover in a tendency to roll up on the roller upon release of either of the ends of the cover.

2. The cover of claim 1 wherein the rear end comprises an end portion sufficiently narrow to fit within a trunk opening on the vehicle and further comprising a rigid element along a far edge of the rear end, the rear end being provided with an opening in a center portion of the rear end, the opening capable of fitting over a locking mechanism of the trunk, so that the rear end of the cover is capable of being hooked over the locking mechanism and the trunk closed with the rear end of the cover locked in the trunk to retain the rear end of the cover therein.

3. The cover of claim 1 wherein the two overlapping portions of the cover are apportioned such that the roller and tension bar are positioned on a roof of the vehicle upon attaching both ends of the cover to the vehicle so that the roller and tension bar maintain the cover in an elevated position above the roof of the vehicle thereby creating an air space between the cover and the roof of the vehicle.

4. The cover of claim 1 wherein the cover further comprises a rigid rod attached across the far edge of the front end of the cover and further comprises a hook means for attaching the front end of the cover to the front of the vehicle.

5. The cover of claim 4 wherein the hook means comprises a cord means having at least one hook capable of hooking onto an element on the front of the vehicle.

6. The cover of claim 5 wherein the cord means has two hooks attached thereto, the hooks having non-scratching surfaces and configurations such that they are capable of hooking under a hood of the vehicle without scratching the vehicle.

7. The cover of claim 1 wherein the roller further comprises at least one end capable of bending to enable the storage of the roller in a trunk of the vehicle when the cover is not in use on the vehicle.

8. The cover of claim 7 wherein the at least one end of the roller is foam material.

9. The cover of claim 1 wherein the tension bar is spaced apart from the roller by at least one rigid element attached to at least one end of the roller and one end of the cover unrolls between the roller and the tension bar.

* * * * *